(12) United States Patent
Raap et al.

(10) Patent No.: US 7,205,983 B2
(45) Date of Patent: Apr. 17, 2007

(54) TOUCH SENSITIVE DISPLAY DEVICE

(75) Inventors: Adriaan Yde Raap, Eindhoven (NL); Mark Thomas Johnson, Eindhoven (NL); Dirk Kornelis Gerhardus De Boer, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 132 days.

(21) Appl. No.: 10/523,620

(22) PCT Filed: Jul. 16, 2003

(86) PCT No.: PCT/IB03/03243

§ 371 (c)(1),
(2), (4) Date: Feb. 1, 2005

(87) PCT Pub. No.: WO2004/013746

PCT Pub. Date: Feb. 12, 2004

(65) Prior Publication Data
US 2005/0231461 A1   Oct. 20, 2005

(30) Foreign Application Priority Data
Aug. 1, 2002 (EP) .................... 02078156

(51) Int. Cl.
G09G 3/36   (2006.01)
(52) U.S. Cl. ..................... 345/173; 345/174
(58) Field of Classification Search ........ 345/173, 345/174; 359/296
See application file for complete search history.

(56) References Cited

U.S. PATENT DOCUMENTS

| 4,814,760 | A | * | 3/1989 | Johnston et al. | ............ 345/104 |
| 5,949,501 | A | | 9/1999 | Izuno et al. | |
| 6,392,786 | B1 | * | 5/2002 | Albert | .................. 359/296 |

FOREIGN PATENT DOCUMENTS

| EP | 0 773 497 | 5/1997 |
| WO | WO 01/02899 | 1/2001 |

OTHER PUBLICATIONS

Patent Abstracts of Japan vol. 2000, No. 20 Jul. 10, 2001 & JP 2001 075074.

* cited by examiner

Primary Examiner—Almis R. Jankus

(57) ABSTRACT

A touch-sensitive display is made by incorporating a pressure dependent resistive polymer composite into the polymer networks, which are components of the electro-optical pixels. Examples are PDLC, electrophoretic displays, polymer dispersed guest/host systems and other polymer dispersed LC devices.

19 Claims, 2 Drawing Sheets

TOUCH SENSITIVE DISPLAY DEVICE

Figure 1:
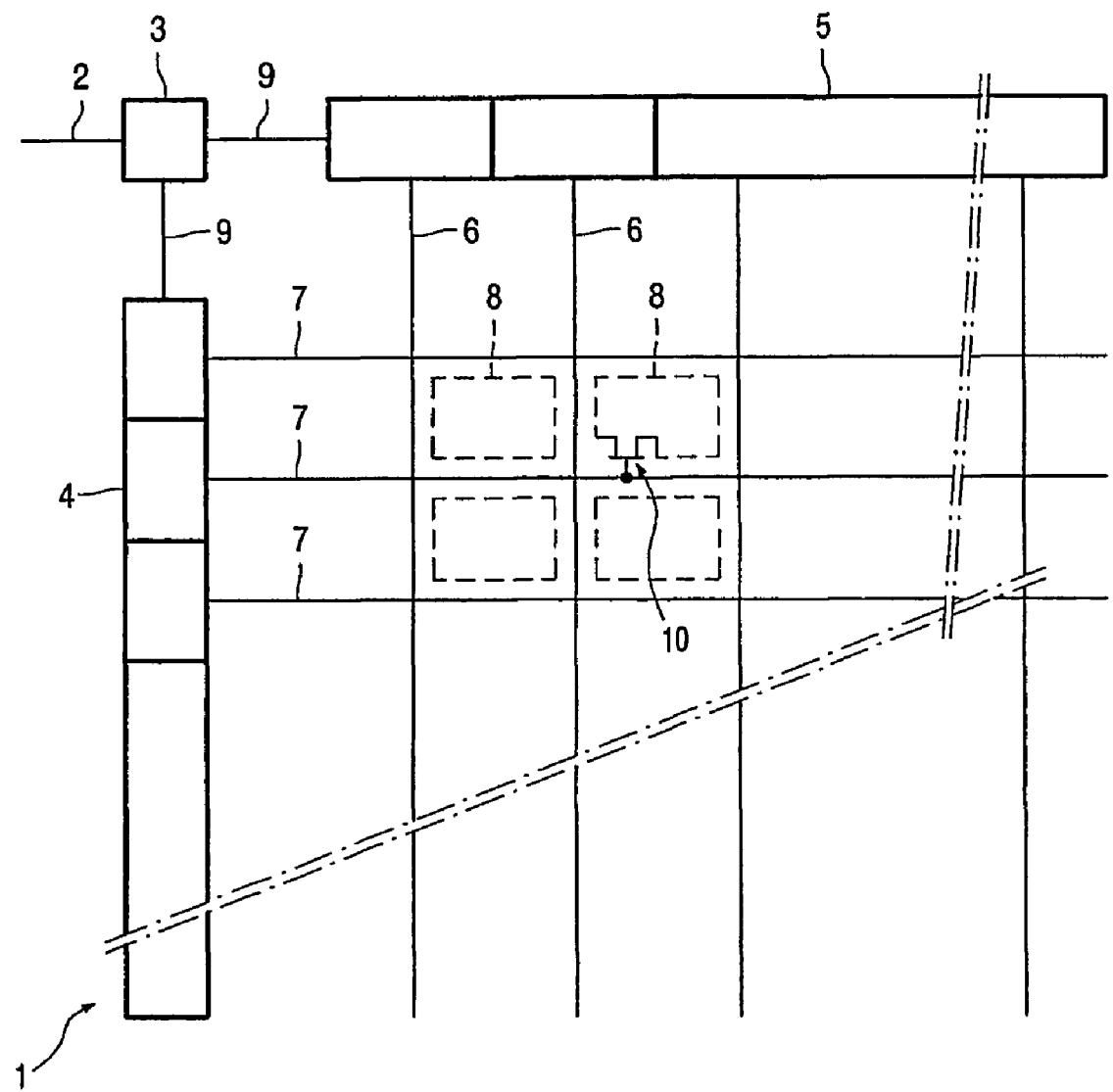

The invention relates to a touch sensitive display device comprising an elastic (e.g. a polymer) structure with a multiple of picture elements and having means for applying driving voltages to said picture elements.

The display device is for instance a polymer dispersed liquid crystal display device. Liquid crystal display devices have found widespread use in the computer industry and in handheld devices ranging from mobile telephones and price tags to palm top computers and organizers. Also the combination with a touching device such as a stylus has found widespread applications, while also a need for ways of providing input via the display screen is felt.

U.S. Pat. No. 5,777,596 describes a touch sensitive liquid crystal display device that allows putting input into the associated device (e.g. a computer) by simply touching the display screen with a finger, a stylus or a pen. The device continuously compares the charge time of the liquid crystal display elements (picture elements) to a reference value and uses the result of the comparison to determine which elements are being touched.

One of the problems in said touch sensitive liquid crystal display device resides in restoring the right image after sensing. This is due to the fact that a blinking line is used which represents the switching of all picture elements in a row between two extreme states. When the blinking line reaches a certain row touching is detected by measuring the charging time of the picture elements. After measuring the picture elements are provided with adequate voltages to display the right image. In a similar way sensing by means of a blinking spot is disclosed in U.S. Pat. No. 5,777,596.

Such blinking however is visible on the display (artifacts) Moreover, if a reflective display device is used, internal DC bias voltages may be present whereby charging differs for writing odd or even frames. In DC-driving methods (low power liquid crystal displays, electrophoretic displays) no inversion occurs so the method cannot be used at all there.

The problem of providing blinking signals can be overcome by making the spacing means (spacers) part of said means for monitoring the electrical characteristics of the picture elements. Said electrical characteristics may be capacitive, (non-linear) resistive or piezo-electric characteristics. However this will require structuring of e.g. the (non-linear) resistor into spacers with similar heights to ensure that electrical contact is created when the display is pressed since locally thinner spacers may not be pressed at all. Such processing will be complex, and touch sensing will not always be efficient at all points on the display.

The invention has among others as its goal to overcome these objections especially for display devices comprising a polymer structure.

It has as a further goal to introduce more functionality into the touch sensitive liquid crystal display device.

To this end in a touch sensitive display device according to the invention the elastic structure comprises touch sensitive elements while the touch sensitive display device has means for monitoring the electrical characteristics of said touch sensitive elements and sensing a change in said electrical characteristics.

By incorporating the polymer with pressure sensitive characteristics (e.g. non-linear resistivity such as may be realized by means of quantum tunneling composites) into the polymer network of the pixel, the pixel itself becomes intrinsically touch sensitive.

In this way the need for structured spacers is avoided, while the entire pixel area is touch sensitive, which increases the touch sensitivity and makes this touch sensitive display applicable for flexible and even wearable display applications.

In a further embodiment the means for monitoring the electrical characteristics of the touch sensitive elements comprise at least an electrode of a picture element.

The advantage of using the pixel itself as part of the touch sensitive element is that now the pixel electrodes can also be used for measuring the touch signal. In this way, no extra connections need to be made to the displays. Sensing can be carried out by simply identifying which row and column have been temporarily short-circuited by the touch pressure.

In a preferred embodiments the picture elements comprise at least one capsule containing an electro-optical medium. Examples are display devices based on liquid crystal—polymer composites like polymer-dispersed liquid crystal display devices, guest host systems, Axially Symmetric Mode liquid crystal display devices or electrophoretic displays while also eletrochromic displays and displays based on electrowetting may be thought of.

These and other aspects of the invention are apparent from and will be elucidated with reference to the embodiments described hereinafter.

Figure 2:
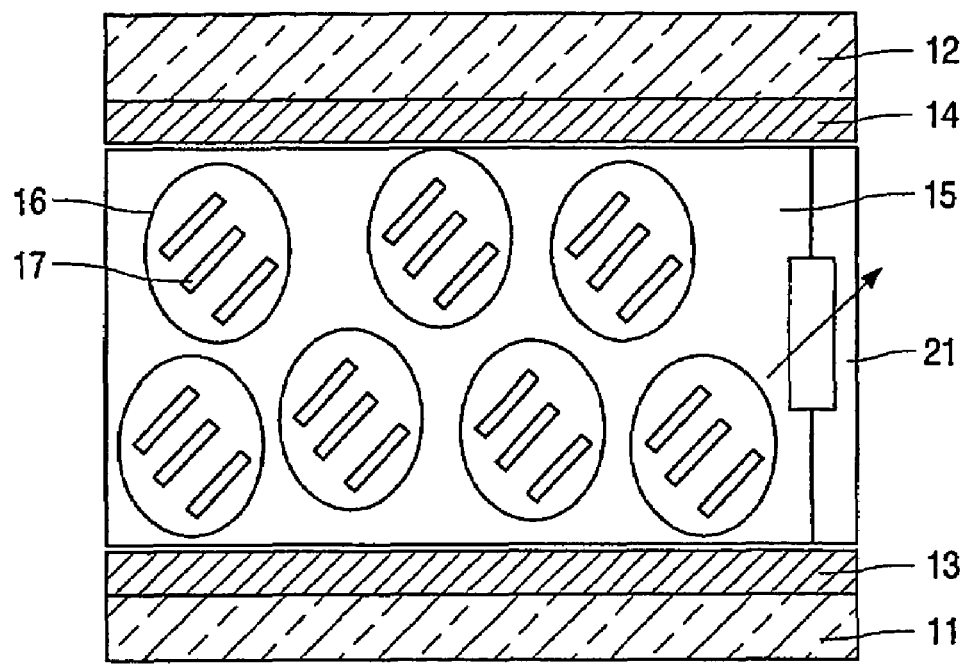
Figure 3:
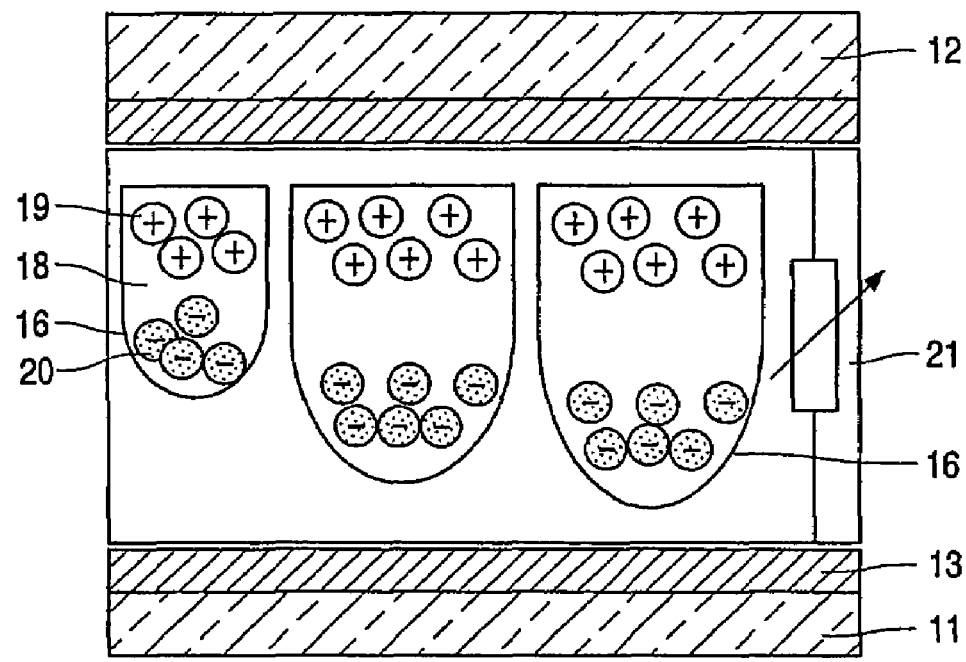

In the drawings:

FIG. 1 schematically shows a touch sensitive (liquid crystal) display device,

FIGS. 2 and 3 show cross-sections of a part of a touch sensitive (liquid crystal) display device according to the invention.

The Figures are diagrammatic and not drawn to scale. Corresponding elements are generally denoted by the same reference numerals.

FIG. 1 is an electric equivalent circuit diagram of a part of a touch sensitive display device 1 to which the invention is applicable. It comprises in one possible embodiment (one mode of driving, called the "passive mode") a matrix of pixels 8 defined by the areas of crossings of row or selection electrodes 7 and column or data electrodes 6. The row electrodes are consecutively selected by means of a row driver 4, while the column electrodes are provided with data via a data register 5. To this end, incoming data 2 are first processed, if necessary, in a processor 3. Mutual synchronization between the row driver 4 and the data register 5 takes place via drive lines 9.

In another possible embodiment (another mode of driving, called the "active mode") signals from the row driver 4 select the picture electrodes via thin-film transistors (TFTs) 10 whose gate electrodes are electrically connected to the row electrodes 7 and the source electrodes are electrically connected to the column electrodes. The signal which is present at the column electrode 6 is transferred via the TFT to a picture electrode of a pixel 8 coupled to the drain electrode. The other picture electrodes are connected to, for example, one (or more) common counter electrode(s). In FIG. 1 only one thin-film transistor (TFT) 10 has been drawn, simply as an example.

FIG. 2 shows a cross-section of a part of a touch sensitive liquid crystal device having a bottom substrate 11 and an upper substrate 12. The touch sensitive liquid crystal device has picture electrodes 13 on the bottom substrate 11 and picture electrodes 14 on the other substrate 12.

According to the invention a polymer structure 15 with pressure sensitive characteristics is provided between the picture electrodes 13, 14, which polymer structure comprises in this example capsules 16 filled with liquid crystal material 17, comparable to PDLC.

A class of materials to be used for the polymer structure 15 is formed by the Quantum Tunnelling Composites (QTC). QTC is a polymer composite with conducting particles deposited in its structure. The conducting particles have dendrites. The particles are spaced apart and do not form a physical conduction path. Tensile or compressive strain on the material however brings the particles close to each other. The space separation of the particles is reduced by the presence of the dendrites. At a certain loading point, the space separation of the particles becomes close enough to enable the electrons from one particle to jump to the other particle through the dendrites. However, the dendrites from two different particles are still not in contact with each other. The quantum tunneling act of the electrons leads to rapid resistivity decrease of the material as a whole. This nonlinear behavior gives rise to a transition point that sharply changes the resistance of the material from $10^{12}$ to $10^{-1}$ $\Omega$.

Hence, QTC is a pressure/force sensitive switching material whose switching properties are comparable to these of a mechanical switch. Moreover it can be moulded into different shapes and can be mixed with other polymers. So in this example the pixel itself becomes intrinsically touch sensitive. This is represented in FIG. 2 by means of the variable resistor 21.

A further example of a liquid crystal display device with polymer network is the so called Axially Symmetric Mode for wide viewing angle liquid crystal display devices and plasma addressed liquid crystal display devices, where pixels are individually encapsulated using a polymer network. Again, this polymer network could be provided with pressure dependent resistivity to enable touch sensing.

FIG. 3. shows a part of an electrophoretic displays in which microcapsules 16 comprise an electrophoretic medium such as an electrophoretic liquid 18 in which positively charged particles 19 and negatively charged particles 20 are suspended. The polymer structure 15 with microcapsules 16 also is suitable for incorporating a QTC into the polymer network to make the pixel intrinsically touch sensitive. In this example, the polymer with pressure sensitive resistance replaces a binder if any, as possibly present in the example of FIG. 2.

An advantage of applying the polymer with pressure dependent resistance to an electrophoretic display (or indeed any other display which is bistable under pressure—such as electrochromic displays) is that it is simple to directly determine the touch position by measuring the resistance between row and column electrodes (passive driving) or between picture electrodes and a counter electrode (active driving). By touching the display, a short circuit is created, which will reduce the voltage across the pixel. In the case of bistable displays, this will not adversely effect the pixel performance (as would be the case in a display which is continuously driven), as there will in any case be no voltage across the pixel during its bistable period.

The protective scope of the invention is not limited to the embodiments described, while the invention is also applicable to other display devices, for example, electrochromic and electrowetting display pixels in which pixels are individually encapsulated using a polymer network. Here also, this polymer network could be provided with pressure dependent resistivity to enable touch sensing. The same applies to a display in which the polymer network forming the binder around the rotating balls with black and white hemispheres could be provided with pressure dependent resistivity to enable touch sensing Alternatively, flexible substrates (synthetic material) may be used (wearable displays, wearable electronics).

In the monitoring different variations are possible too, e.g. monitoring a row of picture elements, a column of picture elements a block of picture elements.

The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

The invention claimed is:

1. A touch sensitive display device comprising an elastic structure with a multiple of picture elements and having means for applying driving voltages to said picture elements, the elastic structure comprising touch sensitive elements, the touch sensitive display device having means for monitoring electrical characteristics of said touch sensitive elements and sensing a change in said electrical characteristics, wherein the touch sensitive elements comprise quantum tunneling composites.

2. The touch sensitive display device as claimed in claim 1, wherein the touch sensitive elements at least have a nonlinear resistive part.

3. The touch sensitive display device as claimed in claim 1, wherein the means for monitoring the electrical characteristics of the touch sensitive elements comprise at least an electrode of a picture element.

4. The touch sensitive display device as claimed in claim 1, wherein the picture elements comprise at least one capsule containing an electro-optical medium.

5. The touch sensitive display device as claimed in claim 4, wherein the electro-optical medium includes a liquid crystal, a guest host system or an electrophoretic medium.

6. The touch sensitive display device as claimed in claim 1, wherein the means for monitoring the electrical characteristics monitor the electrical characteristics of at least one row of picture elements.

7. The touch sensitive display device as claimed in claim 1, wherein the means for monitoring the electrical characteristics monitor the electrical characteristics of at least one column of picture elements.

8. The touch sensitive display device as claimed in claim 1, wherein the means for monitoring the electrical characteristics monitor the electrical characteristics of a block of picture elements.

9. A touch sensitive display comprising: picture elements; at least one driver to drive the picture elements; and
pressure sensitive elements having changeable electrical characteristics in response to a strain, the pressure sensitive elements comprising quantum tunneling composites.

10. The touch sensitive display of claim 9, wherein the picture elements are encapsulated using a polymer network, the polymer network including the pressure sensitive elements.

11. The touch sensitive display of claim 9, wherein the picture elements are suspended in a medium, the pressure sensitive elements being included in the medium.

12. The touch sensitive display of claim 9, wherein the pressure sensitive elements have a resistivity that depends on the strain.

13. The touch sensitive display of claim 9, wherein the pressure sensitive elements have a nonlinear resistivity that depends on the strain.

14. A touch sensitive display device comprising:
picture elements;
at least one driver to drive the picture elements; and
a pressure sensitive elements having changeable electrical characteristics in response to a strain, the pressure sensitive elements comprising conducting particles with dendrites; the conducting particles being separated from each other and being configured to transfer electrons through the dendrites when a spacing between the dendrite is reduced by the strain.

15. The touch sensitive display of claim 14, wherein the picture elements are encapsulated using a polymer network, the polymer network including the pressure sensitive elements.

16. The touch sensitive display of claim 14, wherein the picture elements are suspended an a medium, the pressure sensitive elements being included in the medium.

17. The touch sensitive display of claim 14, wherein the pressure sensitive elements have a resistivity that depends on the strain.

18. The touch sensitive display of claim 14, wherein the pressure sensitive elements have a nonlinear resistivity that depends on the strain.

19. The touch sensitive display of claim 14, wherein the transfer of electrons reduces resistivity of the pressure sensitive elements.

* * * * *